United States Patent
Zhou et al.

(10) Patent No.: US 9,107,045 B2
(45) Date of Patent: Aug. 11, 2015

(54) CROWDSOURCING METHOD TO DETECT BROKEN WIFI INDOOR LOCATIONING MODEL

(71) Applicant: Google Inc., Mountain View, CA (US)

(72) Inventors: Shuchang Zhou, Beijing (CN); Anup Mantri, Mountain View, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 13/937,378

(22) Filed: Jul. 9, 2013

(65) Prior Publication Data
US 2015/0018003 A1    Jan. 15, 2015

(51) Int. Cl.
| | |
|---|---|
| H04W 24/00 | (2009.01) |
| H04W 4/04 | (2009.01) |
| H04W 64/00 | (2009.01) |
| G01S 5/02 | (2010.01) |
| H04W 16/20 | (2009.01) |

(52) U.S. Cl.
CPC ............ *H04W 4/043* (2013.01); *H04W 64/003* (2013.01); *G01S 5/0242* (2013.01); *H04W 16/20* (2013.01)

(58) Field of Classification Search
CPC ..... H04W 64/00; H04W 16/20; H04W 4/043; H04W 64/003; G01S 5/0242
USPC ............ 455/456.1, 41.2, 550.1, 422.1, 556.2, 455/436, 439; 370/328, 338, 331, 332
See application file for complete search history.

(56) References Cited

U.S. PATENT DOCUMENTS

| | | | |
|---|---|---|---|
| 8,259,652 B2 | 9/2012 | Huang et al. | |
| 8,350,758 B1 | 1/2013 | Parvizi et al. | |
| 2005/0197124 A1* | 9/2005 | Kang et al. | ..... 455/439 |
| 2006/0240840 A1* | 10/2006 | Morgan et al. | ..... 455/456.1 |
| 2007/0121560 A1 | 5/2007 | Edge | |
| 2010/0329123 A1 | 12/2010 | Viswanathan et al. | |
| 2011/0176523 A1 | 7/2011 | Huang et al. | |

OTHER PUBLICATIONS

International Search Report and Written Opinion for Application No. PCT/US2014/040480 dated Oct. 29, 2014.

* cited by examiner

*Primary Examiner* — Babar Sarwar
(74) *Attorney, Agent, or Firm* — Lerner, David, Littenberg, Krumholz & Mentlik, LLP

(57) ABSTRACT

Aspects of the present disclosure provide techniques for detecting breaks in a wireless network data model. An exemplary method includes determining neighboring access points from scans of network access points in a space. Each neighboring access point occurs together in a scan of a particular level of the space. Wireless data is received from a plurality of mobile devices moving through a space. A set of all access points for the space is identified based on the wireless data. A ratio is derived based on a difference between the neighboring access points and the set of all access points. The ratio represents a percentage of missing access points for the particular level of the space.

20 Claims, 6 Drawing Sheets

CROWDSOURCING METHOD TO DETECT BROKEN WIFI INDOOR LOCATIONING MODEL

BACKGROUND

Indoor locationing refers to a process of predicting an object's location in an indoor space. For example, a user's indoor location can be predicted by comparing data from wireless access points received at the user's mobile device against a database where mappings between the wireless access points and indoor locations are stored.

An indoor location provider may create these types of databases by conducting on-site surveys at selected locations. The surveys are used to create a model of the indoor space by scanning for locations of the wireless access points and their corresponding signal strengths at those locations. However, overtime some wireless access points may disappear, move, or become otherwise unavailable, leading to inaccurate location predictions and increased location prediction errors.

BRIEF SUMMARY

Aspects of this disclosure may be advantageous for detecting breaks in a wireless network data model. According to aspects, by analyzing wireless data of neighboring network access points used to create a model of an indoor space against wireless data crowd-sourced from a number of users moving through the space, it can be determined whether the neighboring network access points have moved or are no longer available.

One aspect of the present disclosure provides a method. The method includes determining neighboring access points from scans of network access points in a space. Each neighboring access point occurs together in a scan of a particular level of the space. The scans of network access points are used for creating a model of the space. Wireless data is received from a plurality of mobile devices moving through a space. Based on the wireless data, a set of all access points for the space is identified. Using a processor, a ratio is derived based on a difference between the neighboring access points and the set of all access points. The ratio represents a percentage of missing access points for the particular level of the space.

In one example, the wireless data includes information identifying current access points on different levels of the space. In this example, the wireless data is collected over a period of time. The method includes identifying access point neighbors of a given access point on a given level of the space and determining whether the given access point has moved to a different level of the space based on the access point neighbors. The access point neighbors appear together most often with the given access point in the information.

In another example, the method includes determining a number of users to visit a level of the space based on a positioning system. When the number of users to visit the level is below a threshold level, the method may further include determining whether the ratio of missing access points applies to that level.

Another aspect of the present disclosure provides a non-transitory computer readable medium including instructions that, when executed by a processor, cause the processor to perform a method. The method includes determining neighboring access points from scans of network access points in a space. Each neighboring access point occurs together in a scan of a particular level of the space. The scans of network access points are used for creating a model of the space. Wireless data is received from a plurality of mobile devices moving through a space. Based on the wireless data, a set of all access points for the space is identified. Using a processor, a ratio is derived based on a difference between the neighboring access points and the set of all access points. The ratio represents a percentage of missing access points for the particular level of the space.

Yet another aspect of the present disclosure provides a system including a memory and a processor coupled to the memory. The processor is configured to determine neighboring access points from scans of network access points in a space. Each neighboring access point occurs together in a scan of a particular level of the space. Wireless data is received from a plurality of mobile devices moving through a space. Based on the wireless data, a set of all access points for the space is identified. A ratio is derived based on a difference between the neighboring access points and the set of all access points. The ratio represents a percentage of missing access points for the particular level of the space.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The subject matter of the present disclosure relates generally to a scalable method for detecting breaks in a wireless network model of a space, such as a shopping mall or building, based on changes in availability and topology of wireless network access points. While aspects of the disclosure are discussed below in connection with certain types of spaces, the techniques described herein can be used with other spaces where wireless network models are used to predict a user's location in the space.

To generate a wireless network model, wireless data associated with locations within a space may be identified. The wireless data may include information such as network access point identifiers, such as a MAC address and/or SSIDs, and signal strengths. This data may have been collected, for example, by scanning for wireless access points during a site survey of the space. Based on the wireless data from the scans, neighboring access points for a particular level are determined. Each neighboring access point appears together in a single scan used to create a wireless network model for that particular level.

Breaks in the wireless network model can be detected by analyzing neighboring access points against access point data collected from a number of users moving through the space. Based on this analysis, it can be determined whether the neighboring access points have moved or disappeared. In this regard, a ratio may be calculated to determine whether the neighboring access points have disappeared. For example, this ratio may be based on a difference between the access points used to create the wireless network model of a particular level and a set of all access points that are crowd-sourced from users at different levels in the space over a period of time. The ratio represents a percentage of missing network access point (e.g., breaks in the wireless network model) for that particular level of the indoor space.

Figure 1:
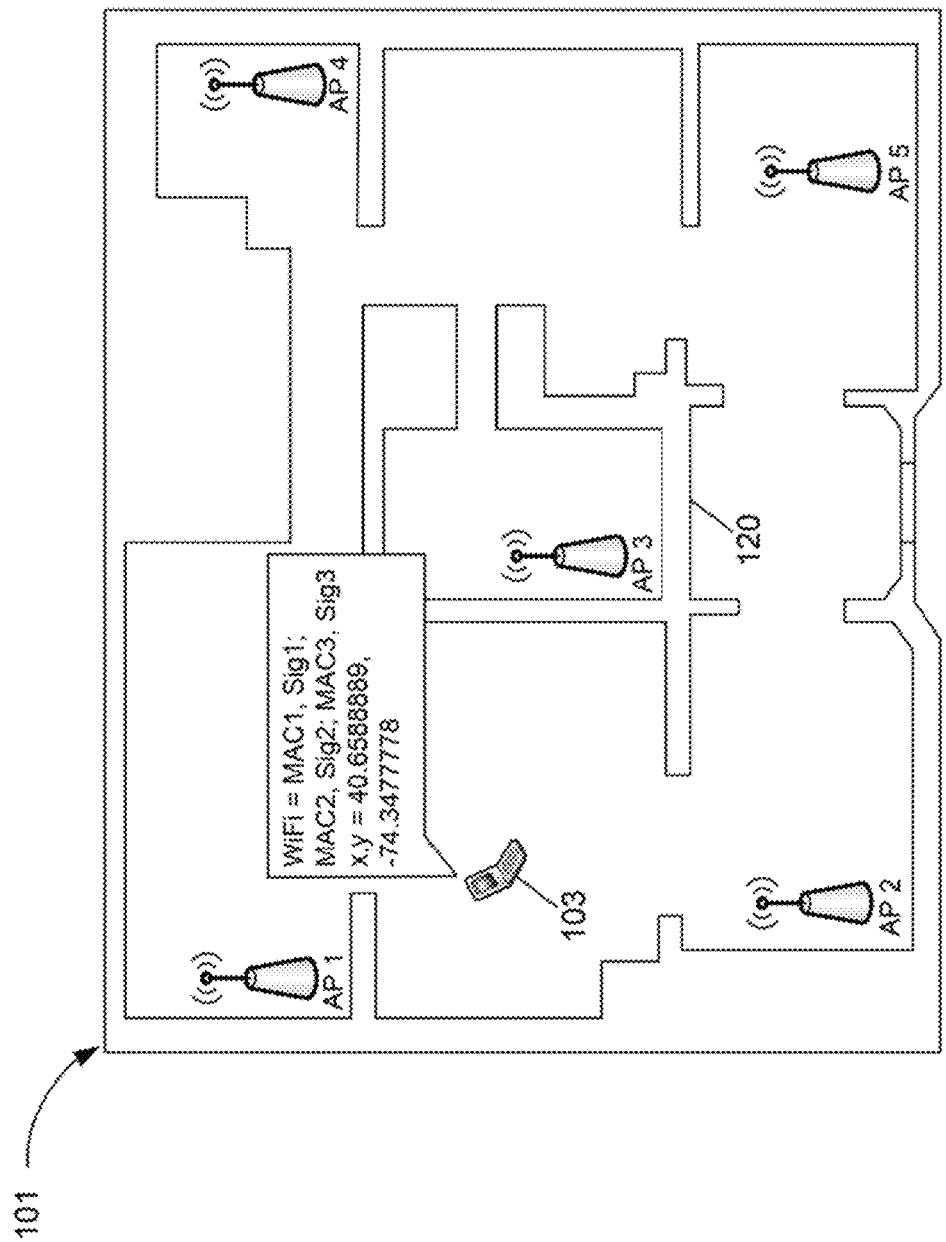
FIG. 1 is an example of a layout of an indoor space in accordance with aspects of the disclosure.

FIG. 1 is an example of a layout 100 of an indoor space 101. The indoor space 101 includes a number of rooms separated by walls 120, and a plurality of wireless network access points AP1-AP5 in various positions throughout the space 101. The access points AP1-AP5 may each have a unique identifier, such as a MAC address, and a transmission signal strength for a predetermined distance. The access points AP1-AP5 can be a type of conventional access point for transmitting data wirelessly, and they need not all be the same as one another.

A device, such as client device 103 in FIG. 1, may traverse the indoor space 101 to conduct a site survey that assesses signal strengths of the access points AP1-AP5 at different positions. Based on a location in the indoor space 101, some of the received signals may be stronger than others. For example, at the current position of client device 103 in space 101, it may receive stronger signals from access points AP1-AP3 than from access points AP4-AP5 because of its proximity to the access points AP1-AP3.

As the signals are received from the various access points AP1-AP5, the access point identifiers and associated signal strengths at each respective position of client device 103 may be recorded. For example, this wireless data may be stored on the client device 103 and uploaded to a central server, or it may be dynamically transmitted to the central server from the client device 103.

For situation in which the subject matter disclosed herein collects wireless data, it need not include any payload information, but only that necessary to identify a wireless network access point (or other wireless network identifier) and its associated signal strength. These access points may transmit wireless signals including data such as a Media Access Control ("MAC") address identifying the access point or Service Set Identifier ("SSID") identifying a wireless network. These signals may be received and recorded by surveyors along with signal strength information for different locations. It will be understood that wireless network data received by surveyors and/or users may be limited to the identification information and signal strengths and need not contain additional information. For example, information contained in the network traffic, such as personal information, need not be collected, and in fact, may actually be removed in order to protect the privacy of the wireless network's users.

Once the wireless data is recorded, a data model of the signals at various positions in the indoor space 101 may be generated. The data model may include a map with a set of access point identifiers and associated signal strengths for at least some or all of access points AP1-AP5. However, various other map schemes may also be used. For example, a map scheme of access points may include: a list of locations associated with indoor space 101 along with corresponding access point identifiers and signal strengths, a topographical or intensity map of access point identifiers and signal strengths, or various other types of map data.

Although the example of indoor space 101 includes only 5 wireless access points AP1-AP5 located at the same level, a typical space can include several wireless access points located at different levels of the space.

Figure 2:
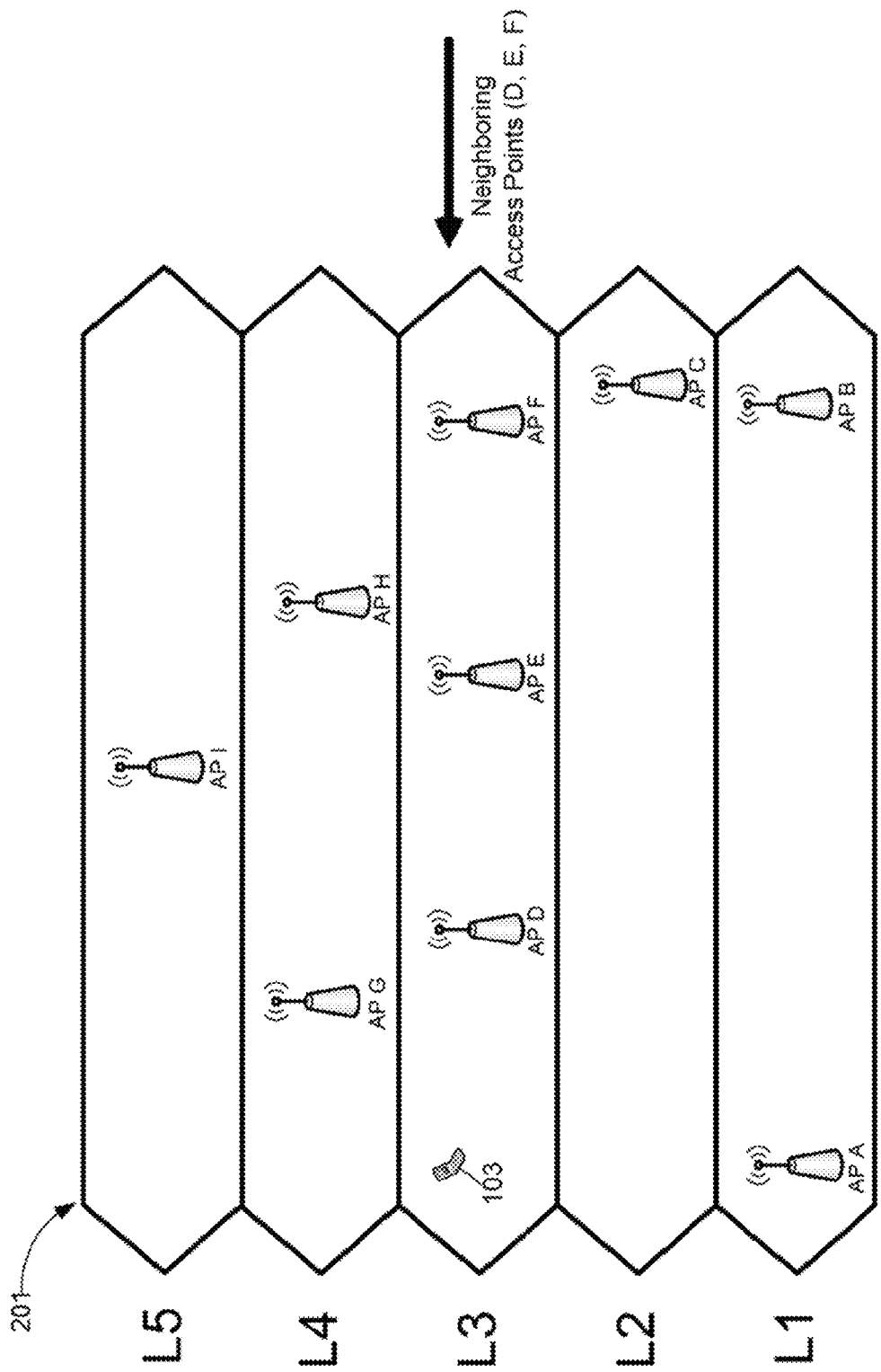
FIG. 2 is an example of access points on multiple levels of an indoor space in accordance with aspects of the disclosure.

In FIG. 2, an example of access points A-I on multiple levels L1-L5 of an indoor space 201 is shown. A device, such as client device 103, may traverse multiple levels and positions in the indoor space 201. At each level and/or position, the client device 103 may perform a scan and record MAC addresses and respective signal strengths of nearby access points. The data may be stored, for example, on a central server, and used to generate a model correlating the signal strength of the access points at the different positions on each level of the indoor space 201.

Using data from these scans, neighboring access points can be identified. For example, client device 103 may observe a set of available access points during a single scan of a particular level of indoor space 201. Each of the access points in this set may be considered "neighbors" of the other access points in the set. For example, due to an attenuation of wireless signals, access points that are close in distance will appear in the same scan. Hence, if there exists a scan where two access points are close in distance, i.e., they are neighbors. In this regard, the server may process all or some of the wireless data from the different scans in order to identify these sets of neighboring access points for each level of the indoor space 201. As discussed above, the scans may be conducted as part of a site survey to create a model for the indoor space 201.

In some aspects, the neighboring access points can be group into several pairs, triples or n-tuples (n>=3) of access points that often appear together in some signal scan. For example, neighboring access points D,E,F identified on level L3 of FIG. 2 can be group into pairs (D,E) (D,F) and (E,F). The neighborhood groupings can be stored, for example, in a database associated with the model for that level. An advantage of storing this neighborhood information is that it can be used to detect moves in access points. For example, for a given access point, such as AP D in FIG. 2, if its previously recorded neighbors (D,E) (D,F) and (E,F) have changed to new neighbors like (D,G) (D,H) and (G,H), then it can be determined that AP D has moved from the vicinity of access points (E,F) to the vicinity of access points (G,H).

As noted above, by analyzing the neighboring access points against crowd-sourced data collected from a number of users moving through the indoor space 201, a disappearance and/or movement of access points (for example, to a distant level) can be determined. An example of a technique for detecting the disappearance of access points in a space is further described below with respect to FIG. 3.

Figure 3:
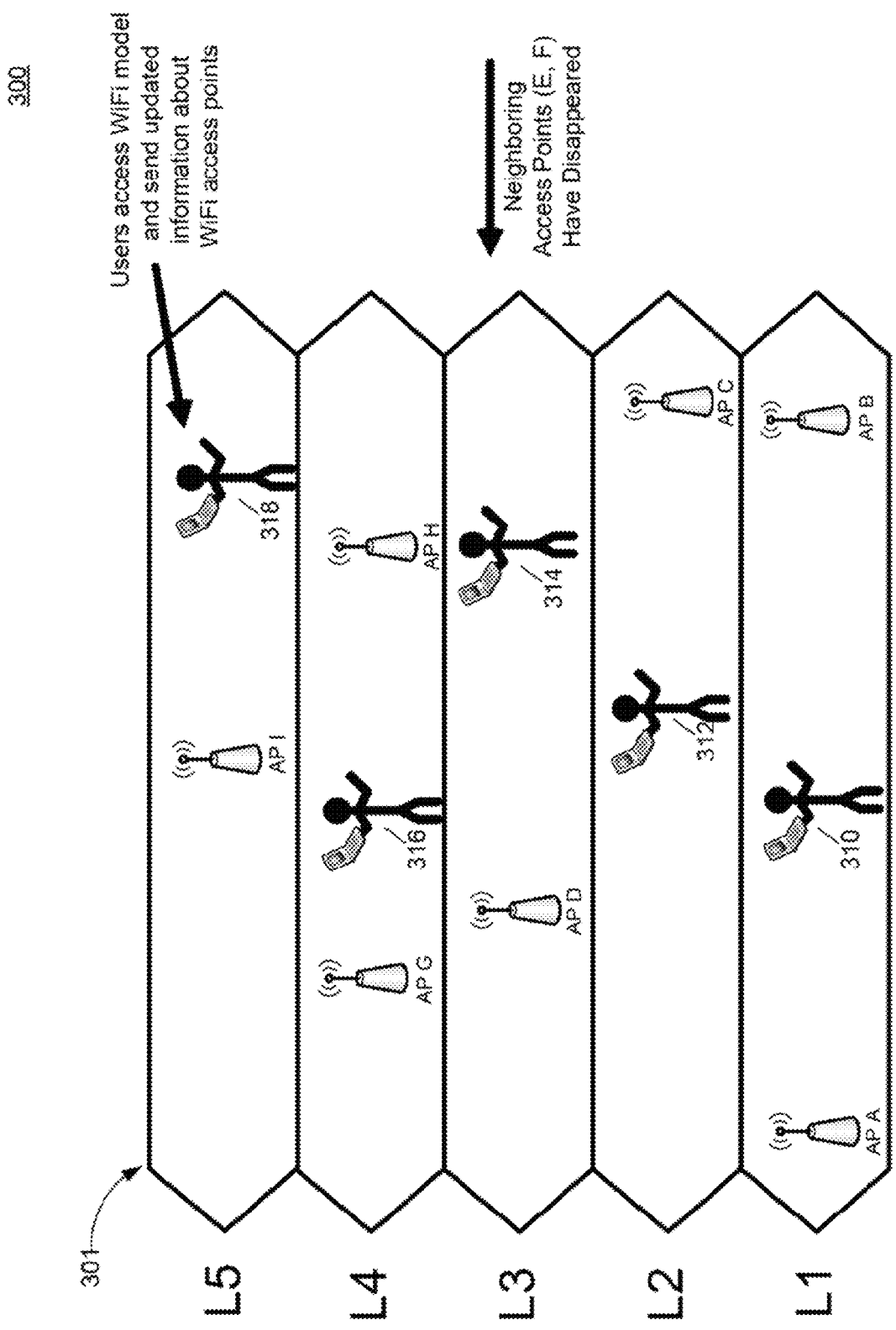
FIG. 3 is another example of access points on multiple levels of an indoor space in accordance with aspects of the disclosure.

In FIG. 3, an example of access points A-I on multiple levels L1-L5 of an indoor space 301 is shown. Users 310-318 may access a data model of indoor space 301 and send updated information regarding access points A-I as they walk their client devices through the indoor space 301. The users 310-318 may be provided with an opportunity to control whether programs or features of the subject matter disclosed herein may collect user information or to control whether and/or how to receive information that may be of interest to the user. In addition, certain data may also be treated in one or more ways before it is stored or used, so that no personally identifiable information can be determined for the user.

Upon entering indoor space 301, users 310-318 may identify a data model of the space 301 using their client devices, such as mobile phones, tablets, netbooks or other type of mobile computing devices. In some instances, to identify the appropriate data model, a user may actively input a location of the indoor space 301 to the user's client device, for example, by selecting a point on a display or entering an address or other location identifying information. In one aspect, a user may scan a bar code or capture an image of some other features associated with a known location (for example, a picture of a door, sign, monument, etc.).

As illustrated in FIG. 3, while the users 310-318 are moving through different levels of the indoor space 301, the users' client devices may receive wireless data from the access points A-I. The wireless data may include a unique identifier, such as a MAC address, for each access point and other data including signal strength data depending on a location of the users 310-318 with respect to the access points A-I. Each user's client device may record the wireless data (e.g., in a time-indexed log of signals) for every unit of time the client device is moving. In some aspects, this wireless data may be crowd-sourced from a number of different user client devices and sent to a central server. For example, the crowd-sourced wireless data may be transmitted to a server on-demand, automatically or in some combination thereof. The server may receive this crowd-sourced signal data from the client devices over a period of time, for example, one month.

The server may analyze the crowd-sourced wireless data using a process to determine a ratio of missing access points. For example, the server may identify access points that have disappeared, such as access points E, F in FIG. 3. In this regard, the process may extract access point identifiers based on the crowd-sourced signal data. Each access point identifiers may represent access points that are currently observed by the client devices as the devices traverse the indoor space 301. Thereupon, a ratio may be calculated to determine whether access points associated with the indoor space 301 have disappeared.

In one aspect, the ratio may be defined as SetSize (SetDifference(M,T))/SetSize(M). This ratio represents a percentage of missing access point identifiers on a given level of the indoor space. In this example, M is a set of neighboring access point identifiers used to model the given level of the indoor space. T is a set of all access point identifiers for the indoor space that are observed in the crowd-sourced data from user client devices over a period of time. Thus, T is not restricted to a particular level in the indoor space.

In another aspect, a similar ratio can be computed based on the grouped access point identifier pairs, triples or n-tuples (n>=3) as described above. The ratio may be defined as SetSize (SetDifference(M2,T2))/SetSize(M2). In this example, M2 is a set of grouped access point identifiers extracted from an on-site survey used to build a given level of an indoor space. T2 is a set of all grouped access point identifiers extracted from the crowd-sourced wireless data of user client devices within the indoor space. As in the previous ratio, the users are not restricted to a particular level in the indoor space.

If users have not visited a certain level often, the amount of crowd-sourced signal data collected may not be enough to detect missing access points for that level. For example, if no crowd-sourced data has been provided for a certain level because, for example, no users have visited that level, SetSize (SetDifference (M,T))/SetSize(M) and SetSize (SetDifference (M2,T2))/SetSize(M2) will be one, regardless of how many access points are actually available on that level. However, there can be at least two possible situations that may result in this calculation being one. For example, in one instance all of the access points for a level may have disappeared and in another instance there may not have been crowdsourcing users that visited the level.

To distinguish between the two possible situations, the number of users to visit a level may be counted by referring to a positioning system, such as a GPS or wireless positioning system. Based on this number, it can be determined whether users have visited certain levels often. If this number is below a predetermined threshold level, the server may determine that there is not sufficient data regarding the level to calculate a ratio of missing access points for that level.

In addition to providing information regarding whether access points have disappeared, neighboring access points can also be used to detect when an access point has moved, such as from one level to a distant level (e.g., 10 meters or more).

Figure 4:
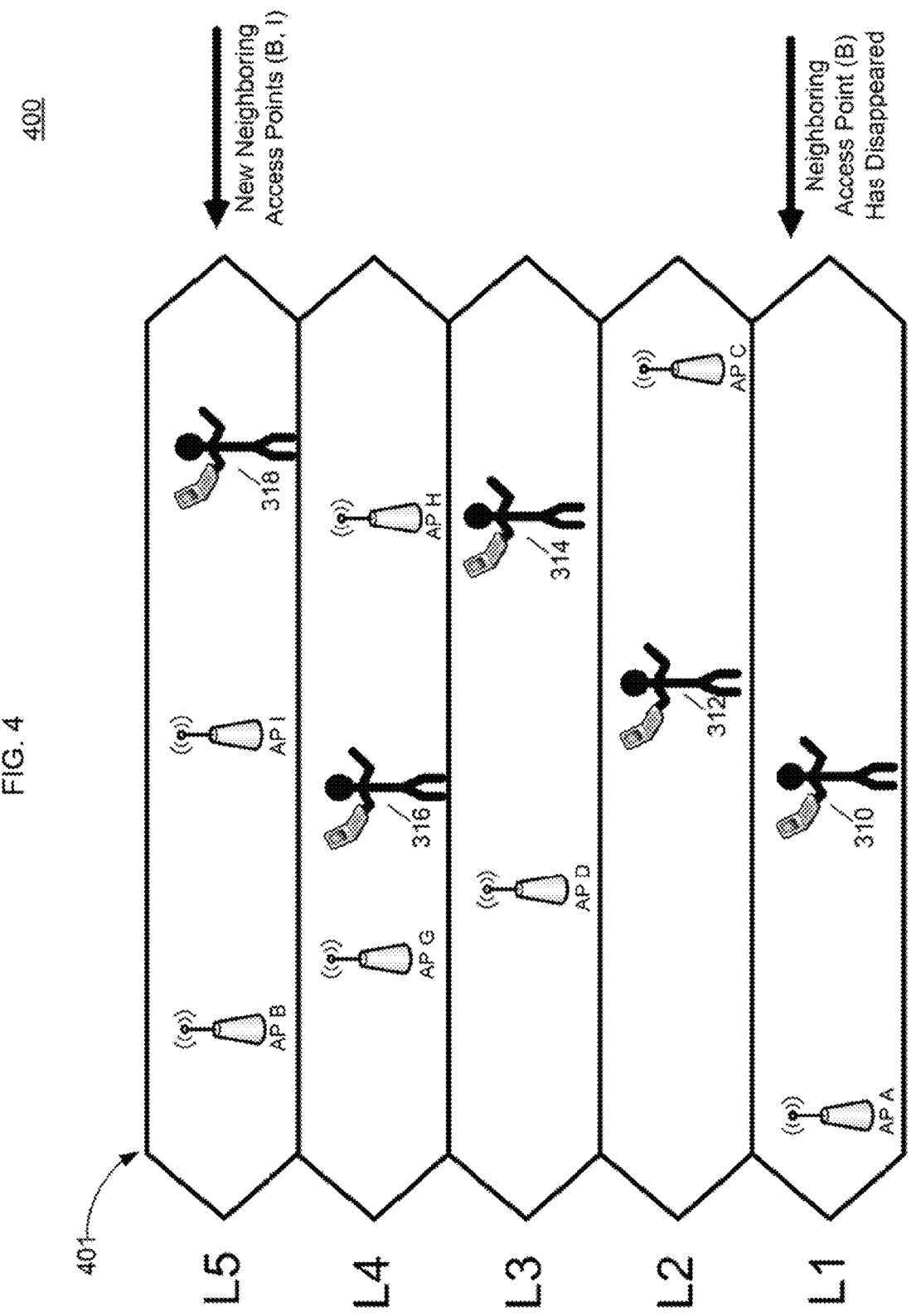
FIG. 4 is yet another example of access points on multiple levels of an indoor space in accordance with aspects of the disclosure.

In FIG. 4, an example of access points A-I on multiple levels L1-L5 of an indoor space 401 is shown. While users 310-314 move through different levels of the indoor space 401, the users' client devices may receive wireless data from the access points A-I within the space. Based on the wireless data, neighboring access points for each level of the space can be identified. Neighboring access points are those access points that often appear together in a single scan of a user's client device.

By analyzing neighbors of the access points, movement of a given access point to a different or distant level can be identified. For example, first a server may identify neighboring access points on each level of indoor space 401. As shown in FIG. 4, if access point B moves from level L1 to level L5 in indoor space 401, it will no longer be neighbors of the access points of level L1, namely access point A, and instead will have access points on level L5 (for example, access point I) as a new neighbor. In this regard, a good measure of a change of neighborhood relations is the missing ratio of access points as described above. In some aspects, upon detecting the movement of an access point, a system in communication with the client devices can be notified in order to adjust various locationing processes used by the system.

Figure 5:
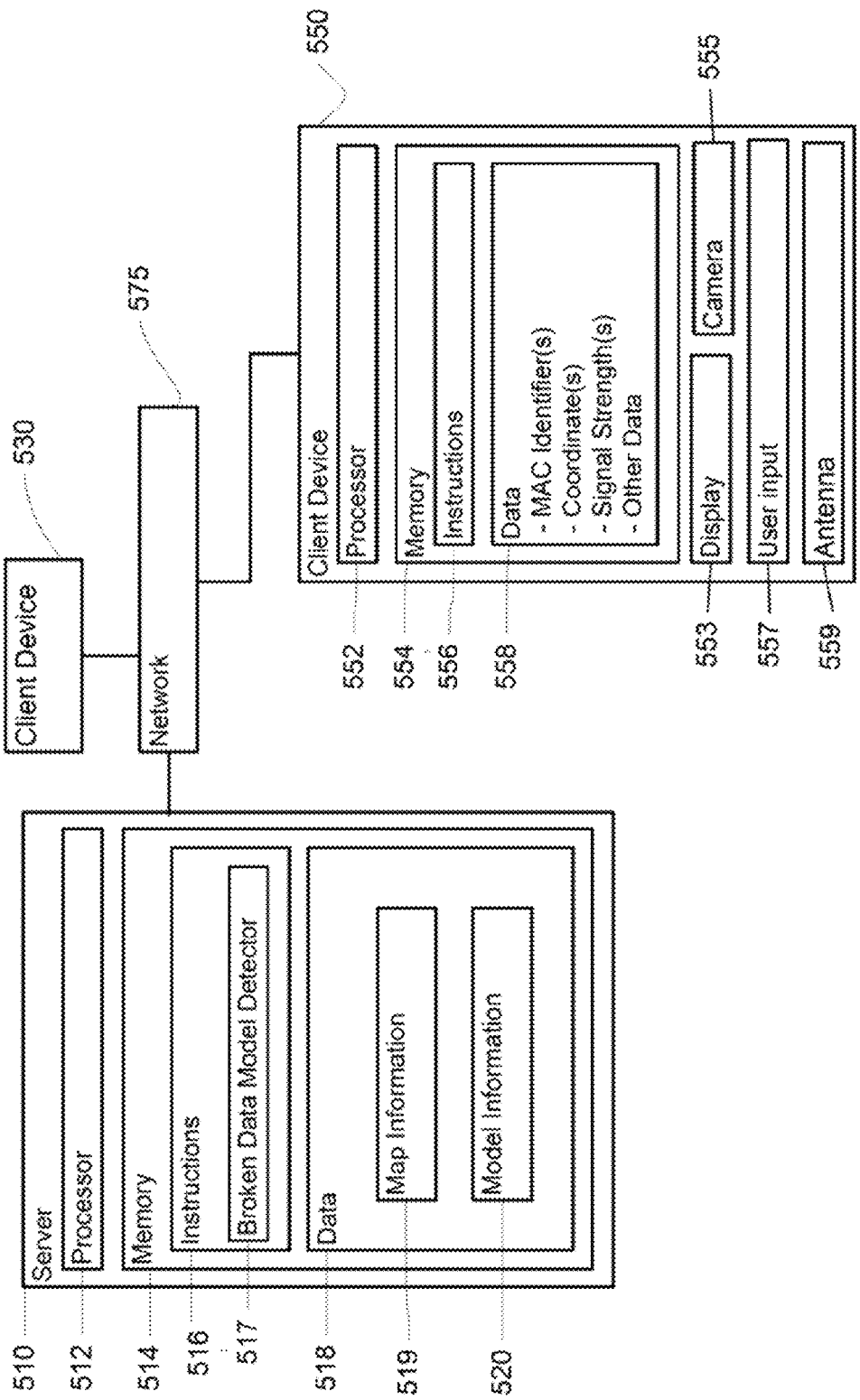
FIG. 5 is a block diagram of a system in accordance with aspects of the disclosure.

FIG. 5 is a block diagram of a system 500, which may be used to detect breaks in a wireless network model as described above. The system 500 includes a server 510 coupled to a network 575 and a number of client devices, such as client devices 530 and 550, capable of communicating with the server 510 over the network 575. The server 510 may include a processor 512, memory 514, and other components typically present in general purpose computers.

The processor 512 may be a suitable processor, such as various commercially available general-purpose processors. Alternatively, the processor 512 may be a dedicated controller such as an application-specific integrated circuit ("ASIC"). Although FIG. 5 functionally illustrates the processor 512 and memory 514 as being within the same block, the processor 512 and memory 514 may actually include multiple processors and memories that may or may not be stored within the same physical housing. For example, some of the instructions 516 and data 518 may be stored on removable CD-ROM and others within a read-only computer chip. Some or all of the instructions and data may be stored in a location physically remote from, yet still accessible by, the processor 512. Similarly, the processor 512 may actually comprise a collection of processors, which may or may not operate in parallel.

The memory 514 of server 510 may store information that is accessible by the processor 512, including instructions 516 that may be executed by the processor 512, and data 518. The memory 514 may be of a type of memory operative to store information accessible by the processor 512, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 516 and data 518 are stored on different types of media.

Data 518 may be retrieved, stored or modified by processor 512 in accordance with the instructions 516. For instance, although the present disclosure is not limited by a particular data structure, the data 518 may be stored in computer registers, in a relational database as a table having a plurality of different fields and records, XML documents, or flat files. The data 518 may also be formatted in a computer-readable format such as, but not limited to, binary values, ASCII or Unicode. By further way of example only, the data 518 may be stored as digital signals comprised of a string of binary digits or binary data stored in compressed or uncompressed, or various digital formats. Moreover, the data 518 may comprise information sufficient to identify the relevant information, such as numbers, descriptive text, proprietary codes, pointers, references to data stored in other memories (including other network locations) or information that is used by a function to calculate the relevant data.

The data 518 may include map information 519, which may include a series of floor plans representing, for example, an indoor space within a building. According to aspects, the map information 519 may be based upon a series of constraints (e.g., walls) representing locations where a user may not walk (or are not able to walk) within the building. These floor plan features may enable users to identify various areas of an space. In some aspects, all or a portion of the map information 519 may be transmitted as needed to client devices 530 and 550 for storage there as well.

Server 110 may access model information 136 associated with a space. As described in more detail below, the model information 136 may include a set of locations associated with the space. Each location of the set of locations may be associated with wireless network access point data describing the expected wireless network access point signals and corresponding signal strengths expected to be detected by a device scanning for such signals at different locations of the space. The expected wireless network access point signals may be specific values or may be a range of values. It should be noted that a set of locations for an indoor space may also be associated with and/or determined based on various signals, such as radio frequency (RF) signals, light, sound image recognition signals, and other types of signals and/or environmental factors or any combination of these.

The server 510 may be at one node of network 575 and capable of directly and indirectly communicating with other nodes of the network 575. For example, the server 510 may include a web server that may be capable of communicating with client devices 530 and 550 via network 575 such that it uses the network 575 to transmit and display information to a user on a display 553 of the client device 550. Server 510 may also include a plurality of computers, e.g., a load balanced server farm, that exchange information with different nodes of a network for the purpose of receiving, processing and transmitting data to client devices 530 and 550. In this instance, the client devices 530 and 550 will typically still be at different nodes of the network 575 than the computers comprising server 510. Although only a few client devices 530, 550 are depicted in FIG. 5, it should be appreciated that a typical system can include a large number of client devices with each being at a different node of the network 575.

The network 575, and intervening nodes, may include various configurations and protocols including the Internet, World Wide Web, intranets, virtual private networks, wide area networks, local networks, private networks using communication protocols proprietary to one or more companies, Ethernet, wireless network (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 530 and 550 over network 575.

Each client device 530 and 550, such as the client device of users 310-318 in FIGS. 3 and 4, may be configured similarly to the server 510, with a processor 552, memory 554, instructions 556, and all of the internal components normally found in a personal computer. By way of example only, the client device 550 may include a central processing unit (CPU), display device 553 (for example, a monitor having a screen, a projector, a touch-screen, a small LCD screen, a television, or another device such as an electrical device that is operable to display information processed by the processor 552), CD-ROM, hard-drive, user input 557, such as a keyboard, mouse, touch-screen or microphone, speakers, modem and/or network interface device (telephone, cable or otherwise) and all of the components used for connecting these elements to one another.

The client device 550 may be a computing device. For example, client device 550 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 550, the client device 550 may be implemented as multiple devices with both portable and non-portable components (e.g., software executing on a rack-mounted server with an interface for gathering location information).

Although the client devices 550 may include a full-sized personal computer, the subject matter of the present disclosure may also be used in connection with mobile devices capable of wirelessly exchanging data. For example, client device 550 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers including general purpose computers, network computers lacking local storage capability, game consoles, and set-top boxes for televisions.

The client device 610 may include an antenna 559, which may be used to scan the wireless network spectrum and identify local wireless network signals. For example, the antenna 559 may receive wireless data to identify wireless network access points. In one example, this data may be IEEE 802.11 management frames transmitted by access points to announce themselves to potential wireless network users. These frames may contain Service Set Identifiers ("SSID") information as well as physical layer parameters that assist devices in connecting to the wireless network. The wireless data may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. This wireless data may be stored in memory 614 as data 618 and may include, for example, MAC Identifiers, location coordinates, signal strengths and other data used to identify wireless network access points.

It will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

The instructions 556 of system 500 may be a set of instructions to be executed directly (such as machine code) or indirectly (such as scripts) by the processor. In that regard, the terms "instructions," "steps" and "programs" may be used interchangeably herein. The instructions 616 may be stored in object code format for direct processing by the processor, or in another computer language including scripts or collections of independent source code modules that are interpreted on demand or compiled in advance. Functions, methods and routines of the instructions are explained in more detail below.

In order to facilitate the operations for detecting breaks in a wireless network model, system 500 may further include a broken data model detector module 517. The functionally of this module can exist in a fewer or greater number of modules than what is shown, with such modules residing at one or more computing devices, which may be geographically dispersed. The detector module 517 may be operable in conjunction with the client device 550 from which it may receive information regarding various wireless access points associated with a space. This information may be used by the detector module 517 to determine missing access points breaks in a data model.

Techniques for determining missing access points in a data model, for example, using the system 500 discussed above, will now be described. It should be understood that the following operations do not have to be performed in the precise order described below. Rather, as mentioned above, various operations can be handled in a different order or simultaneously, and operations may be added or omitted.

Figure 6:
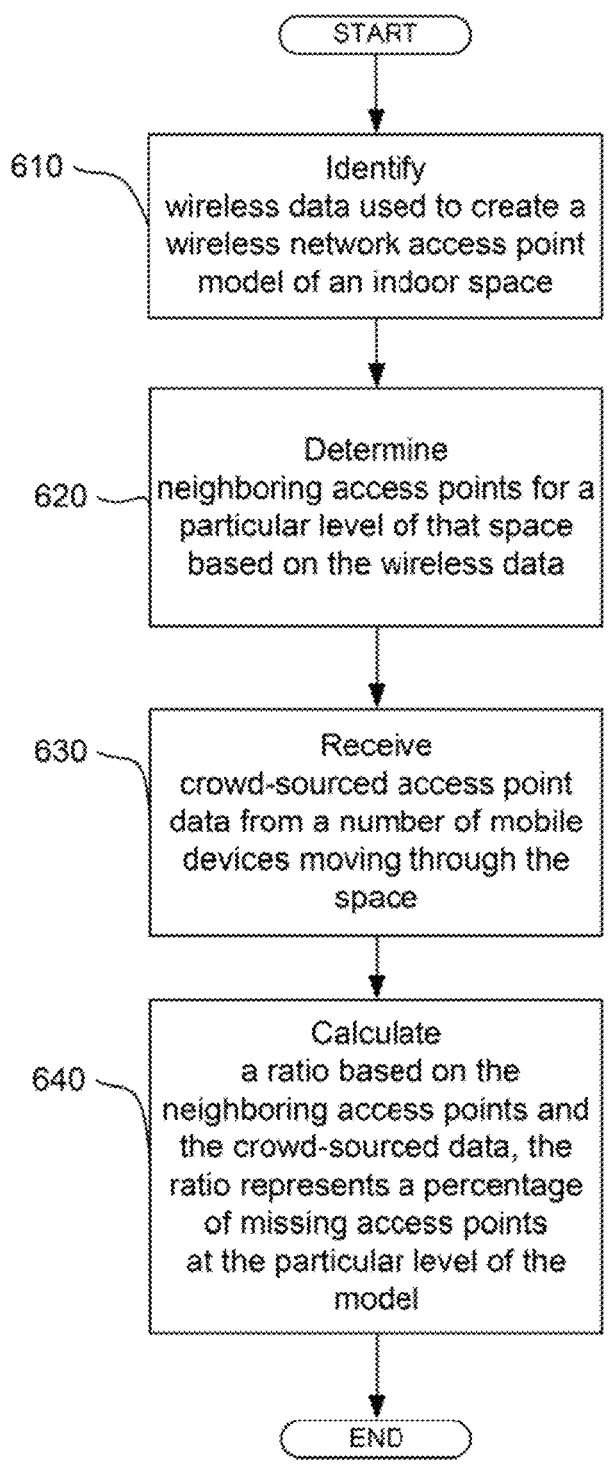
FIG. 6 is a flow diagram depicting an example of a method in accordance with aspects of the disclosure.

FIG. 6 is a flow diagram depicting an example of a method 600. At stage 610, wireless data used to create a wireless network model of an indoor space may be identified. The wireless data may be collected by scanning for wireless access points in the indoor space. For example, a device may traverse the indoor space 101 to conduct a site survey that assesses signal strengths of the access points at different positions in the indoor space. In some aspects, the device may traverse multiple levels and positions in the indoor space. At each level, the device may perform a scan for wireless network data that includes, for example, MAC addresses and respective signal strength of nearby access points. This wireless network data may be stored on a central server.

At stage 620, neighboring access points for a particular level of the space may be determined based on the wireless data from stage 610. Each neighboring access point may occur in a scan of the wireless access points used to create the wireless network model for a particular level. For example, a device used at stage 610 may observe a list of available network access point during a scan of wireless data of a particular level of an indoor space.

At stage 630, crowd-sourced access point data may be received from a number of client devices moving through the indoor space. For example, while users are moving through different levels of an indoor space, the users' client devices may receive access point data regarding a number of access points within the space. The access point data may include a unique identifier for each access point and other data regarding a position of the access point in the space. These client devices may record access point data crowd-sourced from the users and transmit this data, for example, to a central sever.

At stage 640, a ratio may be calculated based on the neighboring access points and the crowd-sourced access point data. For example, this ratio may be defined as SetSize (SetDIfference(M,T))/SetSize(M), where M is a set of neighboring access identifiers identified at stage 620 and T is a set of all access point identifiers that are crowd-sourced at stage 630 from user client devices' over a period of time. The ratio represents a percentage of missing access points in the wireless network model of the indoor space.

The above-described aspects of the present disclosure may be advantageous for providing a scalable method of identifying broken wireless network models by exploiting crowd-sourcing data collected from a number of participating users. By analyzing neighboring network access points used to create a wireless network model of a space against crowd-sourced data from that same space, it can be determined whether the neighboring network access points have moved or are otherwise unavailable. This may be useful in minimizing costs as well as expenses for maintaining accurate and up to date wireless network models used for locating users within a space. Moreover, the various techniques and parameters disclosed within may be further reconfigured to increase confidence in the detected wireless network model breaks.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method, comprising:
    determining a set of neighboring access points from scans of network access points in a space, wherein each neighboring access point occurs together in a scan of a particular level of the space;
    receiving wireless data from a plurality of mobile devices moving through the space;
    identifying a set of all access points for the space based on the wireless data; and
    deriving, using a processor, a ratio based on the size of a difference between the set of neighboring access points and the set of all access points, the ratio representing a percentage of missing access points for the particular level of the space.

2. The method of claim 1, wherein the scans of network access points are used for creating a model of the space.

3. The method of claim 1, wherein the wireless data includes information identifying current access points on different levels of the space, the wireless data is collected over a period of time.

4. The method of claim 3, further comprising identifying access point neighbors of a given access point on a given level of the space, the access point neighbors appear together most often with the given access point in the information.

5. The method of claim 4 further comprising determining whether the given access point has moved to a different level of the space based on the access point neighbors.

6. The method of claim 1, further comprising determining a number of users to visit a level of the space based on a positioning system.

7. The method of claim 6, wherein when the number of users to visit the level is below a threshold level, the method further comprises determining whether the ratio of missing access points applies to that level.

8. A non-transitory computer readable medium comprising instructions that, when executed by a processor, cause the processor to perform a method, the method comprising:
   determining a set of neighboring access points from scans of network access points in a space, wherein each neighboring access point occurs together in a scan of a particular level of the space;
   receiving wireless data from a plurality of mobile devices moving through the space;
   identifying a set of all access points for the space based on the wireless data; and
   deriving, using a processor, a ratio based on the size of a difference between the set of neighboring access points and the set of all access points, the ratio representing a percentage of missing access points for the particular level of the space.

9. The non-transitory computer readable medium of claim 8, wherein the wireless data includes information identifying current access points on different levels of the space, the wireless data is collected over a period of time.

10. The non-transitory computer readable medium of claim 9, wherein the method further comprises identifying access point neighbors of a given access point on a given level of the space, the access point neighbors appear together most often with the given access in the information.

11. The non-transitory computer readable medium of claim 10, wherein the method further comprises determining whether the given access point has moved to a different level of the space based on the access point neighbors.

12. The non-transitory computer readable medium of claim 8, wherein the method further comprises determining a number of users to visit a level of the space based on a positioning system.

13. The non-transitory computer readable medium of claim 12, wherein when the number of users to visit the level is below a threshold level, the method further comprises determining whether the ratio of missing access points applies to that level.

14. A system, comprising:
   a memory; and
      a processor coupled to the memory, the processor being configured to:
   determine a set of neighboring access points from scans of network access points in a space, wherein each neighboring access point occurs together in a scan of a particular level of the space;
   receive wireless data from a plurality of mobile devices moving through the space;
   identify a set of all access points for the space based on the wireless data; and
   derive a ratio based on the size of a difference between the set of neighboring access points and the set of all access points, the ratio representing a percentage of missing access points for the particular level of the space.

15. The system of claim 14, wherein the scans of network access points are used for creating a model of the space.

16. The system of claim 15, wherein the wireless data includes information identifying current access points on different levels of the space, the wireless data is collected over a period of time.

17. The system of claim 16, wherein the processor is further configured to identify access point neighbors of a given access point on a given level of the space, the access point neighbors appear together most often with the given access point in the information.

18. The system of claim 17, wherein the processor is further configured to determine whether the given access point has moved to a different level of the space based on the access point neighbors.

19. The system of claim 14, wherein the processor is further configured to determine a number of users to visit a level of the space based on a positioning system.

20. The system of claim 19, wherein when the number of users to visit the level is below a threshold level the processor is further configured to determine whether the ratio of missing access points applies to that level.

* * * * *